United States Patent

Gregory et al.

Patent Number: 5,083,531
Date of Patent: Jan. 28, 1992

[54] REMOVABLE INLET SHAPE FOR INTERNAL COMBUSTION ENGINE

[76] Inventors: Steve Gregory, 104 Eagle Point Dr., Irvine, Calif. 92714; Dan S. Wible, P.O. Box 68272, Seattle, Wash. 98168

[21] Appl. No.: 674,403

[22] Filed: Mar. 25, 1991

Related U.S. Application Data

[63] Continuation-in-part of Ser. No. 549,312, Jul. 9, 1990, abandoned.

[51] Int. Cl.$^5$ ............................................. F02M 35/00
[52] U.S. Cl. ............................ 123/52 M; 123/193 CH
[58] Field of Search ........ 123/193 C, 193 CH, 193 H, 123/73 V, 73 L, 52 M

[56] References Cited

U.S. PATENT DOCUMENTS

| | | | |
|---|---|---|---|
| 4,492,212 | 1/1985 | Dooley | 123/52 M |
| 4,811,702 | 3/1987 | Oppie et al. | 123/52 M |
| 4,879,976 | 11/1989 | Boyesen | 123/73 V |
| 4,889,081 | 12/1989 | Ozaki | 123/52 M |
| 5,027,754 | 7/1991 | Morone | 123/73 V |

FOREIGN PATENT DOCUMENTS 0091362  5/1983  Japan ................................ 123/52 M

*Primary Examiner*—E. Rollins Cross
*Assistant Examiner*—Marguerite Macy

*Attorney, Agent, or Firm*—Walter A. Hackler

[57] ABSTRACT

An intake air flow divider insert is provided for use in an air intake duct connected to the intake end of an air intake manifold for an internal combustion engine, the manifold having a number, N, of intake air flow passages originating at the air intake end thereof, the number, N, being equal to at least two. The air flow divider insert device comprises an insert body having walls configured for smoothly dividing a single flow of intake air flowing through the duct and impinging on upstream regions of the device into a number, N, of air flows, wherein the number of air flows is equal to the number, N, of manifold intake air flow passages, the walls being configured for diverting each of said N air flows smoothly into a corresponding one of the manifold intake air passages when the insert is positioned in the air intake duct to be just upstream of the manifold when the duct is connected to the manifold. Peripheral edge regions of the insert device are configured for enabling the device to be fixed inside the air intake duct upstream adjacent the air intake manifold when the intake duct is connected to the inlet end of the manifold in its normal manner. When the number, N, is equal to two the insert device has a central web having a variable downstream width that substantially conforms to the spacing between the two air intake passages in the air intake manifold at the intake end thereof.

19 Claims, 3 Drawing Sheets

REMOVABLE INLET SHAPE FOR INTERNAL COMBUSTION ENGINE

BACKGROUND OF THE INVENTION

This application is a continuation-in-part application of application Ser. No. 07/549,312, which was filed on July 9, 1990, and which is abandoned with the filing of this application.

1. Field of the Invention

This invention relates generally to the field of intake air systems for internal combustion engines having two or more separate air flow channels for providing two or more flows of air to different regions of a carburetor or fuel injector system.

2. Background Discussion

Regardless of the configuration of the air intake manifolds of internal combustion engines used in automobiles and the placement of such manifolds in the automobile engine compartments, air for the engines is ordinarily provided to the manifolds from outside the engine compartments by means of ducts. Typically, the air intake duct for any air intake manifold is a single air flow tube—usually flattened—formed having a flexible "accordion-pleated" portion to enable adjustable fitting of the duct to an inlet region of the manifold and to isolate other portions of the duct which are fixed to the automobile body from engine vibrations, the engine itself being mounted to the automobile frame by rubber engine mounts to otherwise isolate the automobile from engine vibrations.

Often, if not usually, the air intake manifolds of the engines—especially for fuel-injected engines which are commonly used at the present time—have two or more separated internal duct-like channels for supplying combustion air to different engine cylinders or groups of cylinders. For example, two such manifold internal channels may be provided to separately carry or route combustion air to each bank of three cylinders in a V-6 engine or each bank of four cylinders in a V-8 engine. Ordinarily, these manifold internal channels originate at the inlet or intake end region of the manifold to which the above-mentioned air intake duct is detachably connected—typically by a large screw-adjustable hose clamp.

Air supply inefficiencies, with a resultant reduction of engine power over that which is theoretically possible, as a result of air flow turbulence caused in the region where the air supply duct, which is not divided into air flow channels, discharges intake air into the manifold inlet which is divided into air flow channels. One cause for this air flow turbulence is impingement of the air from the air intake duct against upstream face regions of the intake manifold between its two (or more) air flow channel openings. As a result of intake air turbulence in this interface region between the air intake duct and the inlet of the air intake manifold and the air flow back pressure caused thereby, the volumetric flow of intake air into the manifold is restricted over that which would be the case if the air flow into the air intake manifold channels were smoother or laminar, and engine power and performance is reduced over that which should otherwise be possible.

It is, therefore, a principal objective of the present invention to provide an insert device for installation in the air intake duct at the region thereof which detachably connects to the inlet end of the air intake manifold, the insert device providing for the smooth dividing of the single flow of intake air through the air intake duct into however many air flow channels which exist in the air intake manifold.

SUMMARY OF THE INVENTION

In accordance with the present invention, there is provided an intake air flow divider insert device for use in an air intake duct connected to the intake end of an air intake manifold for an internal combustion engine, the manifold having a number, N, of main intake air flow passages originating at the air intake end thereof, the number, N, being equal to at least two. The insert device comprises an insert body having wall means configured for smoothly dividing the single flow of intake air through the duct and impinging on upstream regions of the device into a number, N, of smaller air flows, wherein the number of the divided, smaller air flows is equal to the number, N, of manifold intake air flow passages. The insert device body is configured for diverting each of the N smaller air flows smoothly into a corresponding one of the manifold N main intake air flow passages when the insert device is installed and properly oriented in the air intake duct and the device is just upstream of the manifold when the duct is detachably connected to the manifold in its usual manner.

Peripheral edge regions of the insert device body are configured for enabling the insert device to be fixed inside the air intake duct adjacent the air intake manifold when the intake duct is detachably connected to the inlet end of the manifold in a normal manner, for example, by the use of a large hose clamp, and without requiring fasteners, such as screws or bolts to retain the insert in place.

In accordance with a preferred embodiment of the invention, the insert device is configured for use with an air intake manifold in which the number, N, of main intake air flow passages is two, in which case the insert device wall means define a central web which has a varying downstream width that substantially conforms to the spacing between the two main intake air passages in the air intake manifold at the intake end thereof. Preferably, the insert device central web is generally triangular or wedge-shaped in transverse cross section, having a relatively sharp upstream edge region which starts the dividing of the single flow of intake air through the intake air duct in which the insert device is installed.

In the case where the inlet end of the manifold is formed having one or more small idling air flow passages between the main air intake channels, the insert device web has a like number of small idling air flow apertures formed therethrough so as to be in axial alignment with the idling air flow passages in the intake manifold when the insert device is properly installed and oriented in the air intake duct to thereby provide separate flows of idling air to the manifold idling air flow passages.

Upstream regions of the insert device are preferably sized and shaped to fit closely into a region of the air intake duct upstream of where the duct detachably connects to the inlet end of the air intake manifold so that intake air flowing through the duct is required to flow around side regions of the insert device web and to be thereby divided into the N smaller air flows.

When the air intake duct is a type which is formed having accordion-pleat corrugations in regions of the duct which detachably connect to the inlet end of the air intake manifold, it is preferred that the insert device body is formed having radial flange regions configured to fit into one of the corrugations in the air intake duct. It is also preferred that if the inlet end of the air intake manifold is formed having a forwardly extending air duct attachment flange defining a recess into the inlet end of the manifold, downstream regions of the insert device body are sized and shaped to fit into the recess.

Fine tuning of an insert device for any particular engine can readily be accomplished by reshaping (as by grinding or filing) the device body web, preferably along the upstream edge region. It can be appreciated that different sizes and shapes of the insert device are provided for different sizes and shapes of air intake ducts and manifolds and for manifolds with different numbers, N, of main intake air passages.

BRIEF DESCRIPTION OF THE DRAWINGS

The present invention can be more readily understood from a consideration of the following detailed description when taken in conjunction with the accompanying drawings, in which.

In the various Figures like elements and features are given the same reference number and/or other identification.

DESCRIPTION OF THE PREFERRED EMBODIMENT

Figure 1:
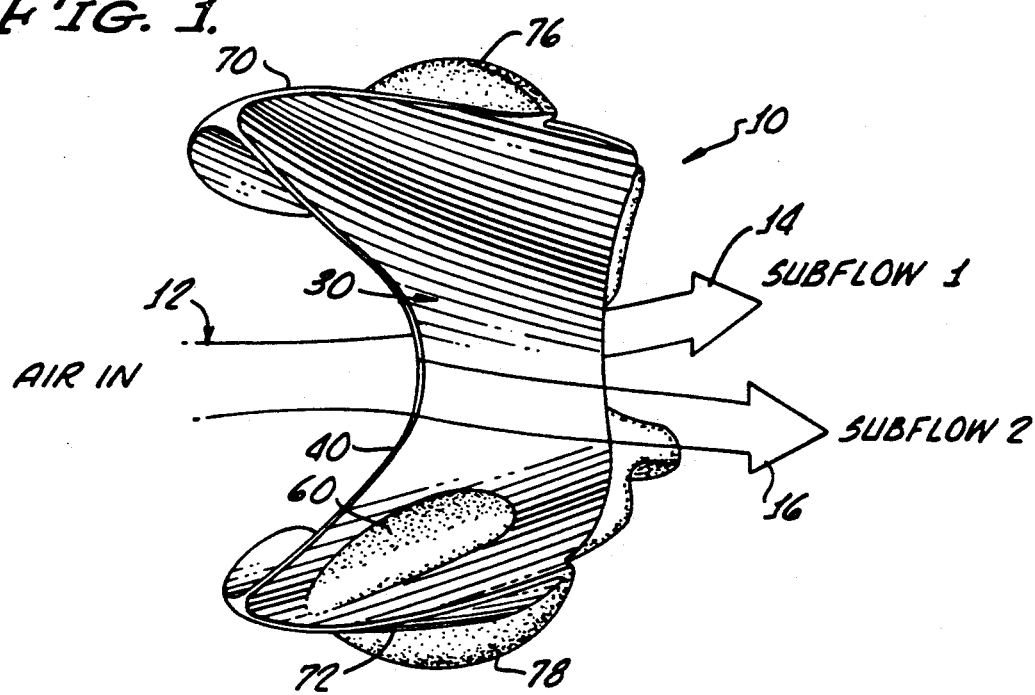
FIG. 1 is a perspective drawing of an air flow diverter insert device for internal combustion air intake systems having two air flow channels, there being shown the general configuration of the air divider insert in accordance with a particular embodiment of the invention and the manner in which a main flow of intake air is divided into first and second sub-flows.

Shown in perspective in FIG. 1 is an exemplary air flow dividing insert device 10 in accordance with a preferred embodiment of the present invention. By way of example, with no limitation being thereby intended or implied, insert device 10 as described herein for purposes of illustrating the invention is a type and configuration found by the inventor to be useful in conjunction with a General Motors type automobile having a tuned port injection system. It will, however, be appreciated and understood from the following detailed description of insert device 10 that the general principles associated with the insert device are applicable to a great many sizes and manufacture of internal combustion engines used in many different types of automobiles and/or other vehicles (including, for example, boats).

As shown and as more particularly described below, insert device 10 is particularly configured for dividing a single flow of intake air 12 impinging on the device into two smaller air flows, a first smaller air flow 14 and a second smaller air flow 16 (FIG. 1), as is advantageous for use with an intake air manifold 18 (shown in phantom lines in FIG. 2) having corresponding first and second internal intake air flow passages or channels 20 and 22, respectively, of circular cross section, formed therein for directing two flows of intake air to separate regions of a fuel injection system (not shown) which is connected to receive air from the manifold.

Considered otherwise, insert device 10 is configured so as to divide the single impinging flow of intake air into a number, N, of smaller air flows which is equal to the number, N, of intake air flow channels formed in intake air manifold 18. Thus, configuration of insert device 10 is designed to match the configuration of a preexisting intake air manifold 18 with which the insert device is intended to be used.

Figure 2:
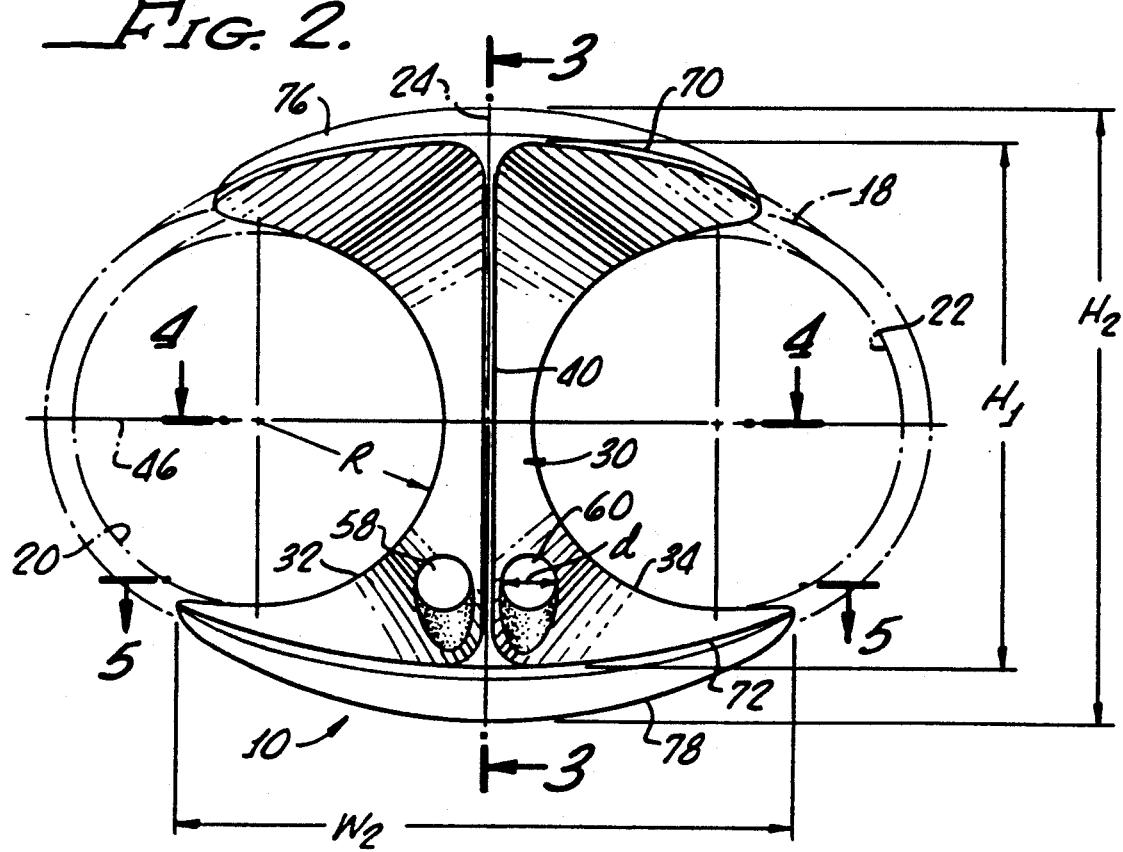
FIG. 2 is a front view of the air flow divider insert device of FIG. 1, showing the air-impingement face of the insert and showing, in phantom lines, a conventional dual air intake manifold with which the device of FIG. 1 is configured for use.

More particularly described, and as shown in FIGS. 2-5, insert device 10 is formed symmetrically about a vertical plane through a vertical axis 24, and having a central web or wall means 30 which splits impinging air flow 12 into the smaller flows 14 and 16 (assuming, as above-described, that manifold 18 is formed having two intake air flow passages 20 and 22). Seen from the front or looking downstream along the direction of single air flow 12, central web 30 defines respective first and second arcuate side edges 32 and 34 which are contoured to be in alignment with corresponding inwardly adjacent side edges of manifold passages 20 and 22 when insert device is installed and properly oriented in a conventional and/or preexisting air intake duct 36 (FIG. 6) which is detachably connected to the inlet end region 38 of air intake manifold 18. As shown in FIG. 2, web side edges 32 and 34 are approximately semi-circular, having a radius of curvature, R, which is the same as the radius, R, of the openings of manifold intake air passages 20 and 22 (for the exemplary manifold 18), and extend about halfway around the corresponding manifold passages.

Figure 3:
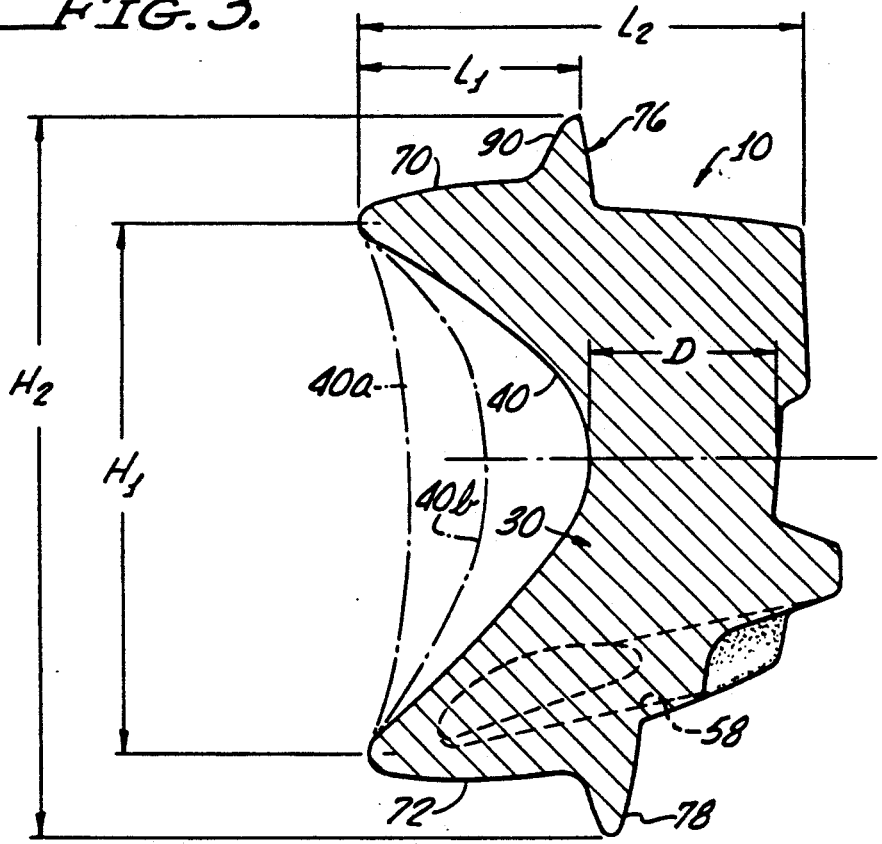
FIG. 3 is a vertical cross sectional view taken along line 3—3 of FIG. 2 which is in the central plane of symmetry, showing the general cross sectional configuration of the device.

As shown in FIG. 3, web 30 of insert device 10 is preferably formed having an arcuate, concave (in a vertical plane through axis 24) leading edge 40 such that the depth of the web in central regions is preferably substantially less than the depth of the web at upper and lower regions thereof. The exact curvature of web leading edge 40 is dependent upon the type and configuration of manifold 18 and the type of internal combustion engine fed by the manifold. In this regard, it may be preferred to start with web leading edge 40 being relatively straight up and down, as shown for phantom line 40a in FIG. 3, and file or grind the leading edge down, for example, to the curvature of phantom line 40b and finally to the edge as shown in solid line, if appropriate, while monitoring the power output of the associated engine under otherwise identical conditions. Such filing or grinding of leading edge 40 is accompanied by filing or grinding down of side regions of the web 30 so that the web is maintained in a general triangular or wedge shape shown in FIG. 4. The "fine-tuning" of insert device 10 in this manner can be continued until maximum engine output is achieved. This procedure is particularly beneficial when designing an insert device 10 for a new air intake duct, manifold and engine combination and configuration. Thereafter, the same shape of device web 30 can be used for devices 10 to be used on similar duct, manifold and engine combinations.

Figure 6:
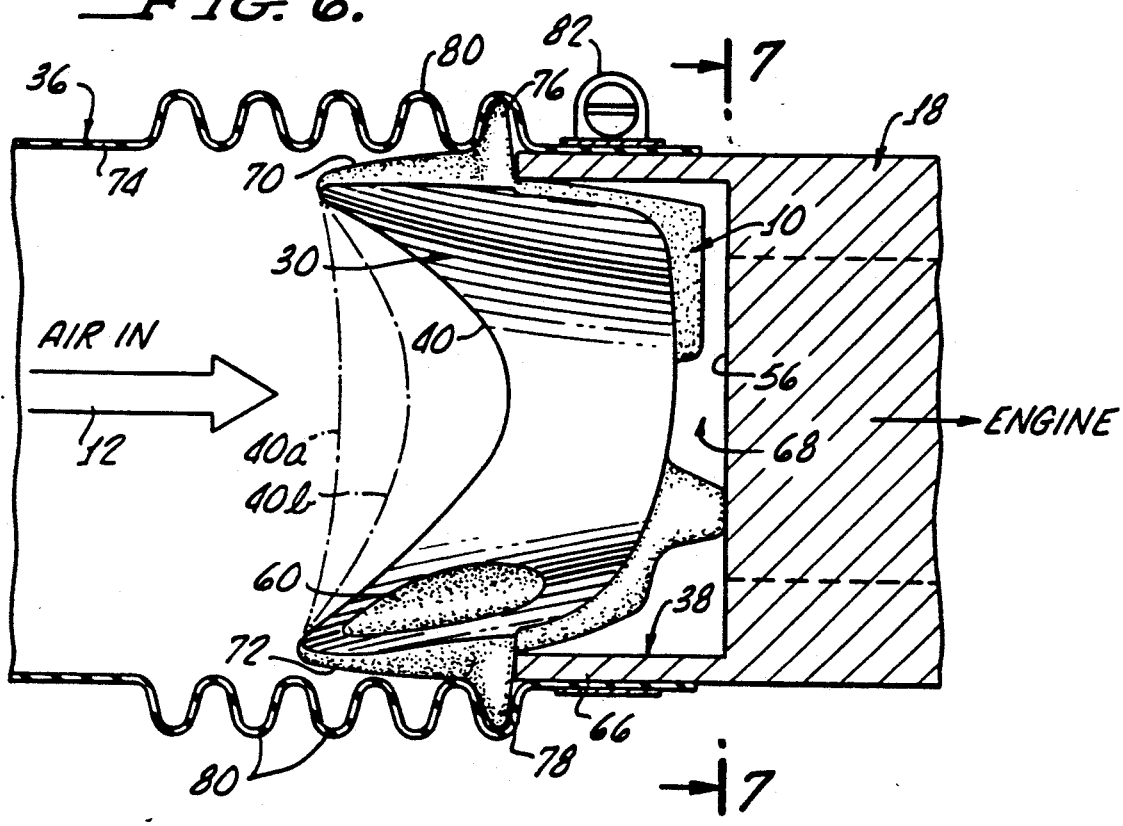
FIG. 6 is a vertical cross sectional view of a representative air intake duct and an dual inlet intake air manifold showing the air flow divider insert device installed at the joining point of the intake duct and the inlet end of the manifold.

Ordinarily, the best results are expected to be obtained with web leading edge rather deeply curved (in the concave direction) as depicted in FIGS. 1, 3 and 6. It is to be appreciated, however, that much, if not most, of improved engine performance attributable to the use of insert device 10 is achieved by the smooth dividing of air flow 12 by web 30 into the two smaller air flows 14 and 16 and the smooth diverting or directing of such smaller air flows by the web into manifold air intake passages 20 and 22.

Figure 4:
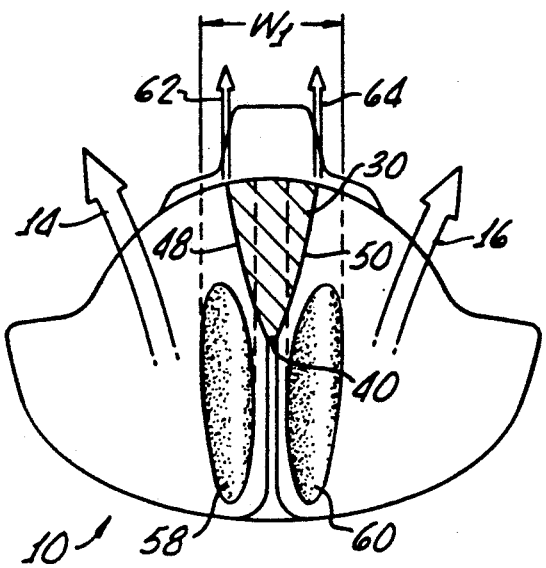
FIG. 4 is a transverse cross sectional view taken along line 4—4 of FIG. 2, showing features of the insert device in central regions thereof.
Figure 5:
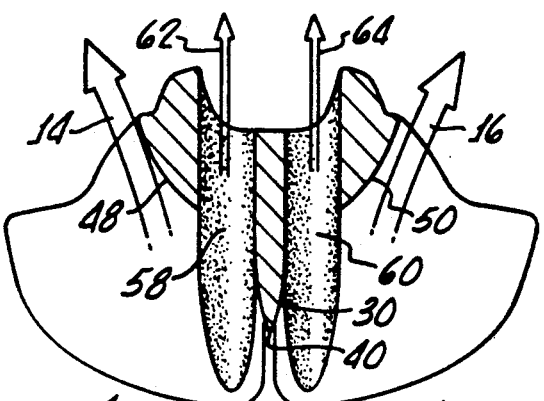
FIG. 5 is a transverse cross sectional drawing taken along line 5—5 of FIG. 2 showing features of the insert device in lower regions thereof and showing idling air flow aperture regions of the device.
Figure 7:
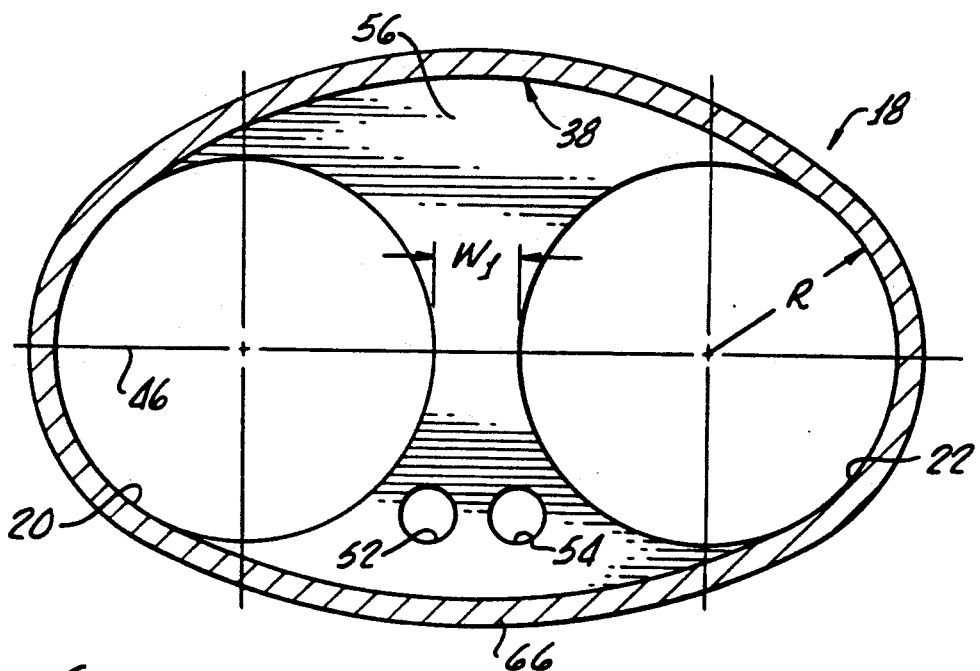
FIG. 7 is a transverse cross sectional view taken along line 7—7 of FIG. 6 showing the dual air inlets of the manifold.

The minimum width, $W_1$, of web 30 (FIG. 4) is along a transverse axis 46 and is equal to the minimum lateral spacing, $W_1$, between adjacent side edges of manifold intake air passages 20 and 22 (FIG. 7). As shown in FIG. 4, web 30 is generally triangular or wedge-shaped in transverse cross section, although respective left-hand and right-hand side surfaces 48 and 50 may be smoothly curved so as to be either slightly convex or concave so as to provide a laminar flow of air in flows 14 and 16 over and past the web. Web 30 is similarly shaped in upper and lower transverse regions, a lower transverse region being shown in FIG. 5 with side surfaces 48 and 50 being shown partially in phantom lines. Preferably side surfaces 48 and 50 are smoothly polished so as to minimize air friction.

Generally, as shown in FIG. 7, manifold 18 is formed having first and second, small diameter internal idling intake air passages or channels 52 and 54 formed, in a side-by-side relationship between manifold intake air passages 20 and 22 and in lower regions of a face 56 of the manifold. To provide intake air to such manifold idling air passages 52 and 54, corresponding first and second idling air flow apertures 58 and 60 are formed, in the direction of air flow, through web 30 in lower regions thereof (FIGS. 2, 4, and 5) in alignment with inlet regions of the manifold idling air passages so as to provide first and second small, idling air flows 62 and 64, respectively, thereto (FIGS. 4 and 5), such small flows coming from main air flow 12 through duct 36 (FIG. 6).

As depicted in FIG. 6, end region 38 of manifold 18 is formed having a forwardly-directed flange 66 around a forward end thereof, the flange defining a generally cylindrical recess 68 defined at its bottom or rearward end by manifold face 56. In such case, rearward regions 70 of insert device 10 are preferably configured to fit into recess 68 so that air flows 16 and 18 are smoothly directed into manifold passages 20 and 22 and small, idling airflows 62 and 64 are smoothly directed into manifold idling air passages 52 and 54.

On the other hand, upper and lower regions of web 30 of insert device 10 are sized so that corresponding upper and lower arcuate outer surfaces 70 and 72 fit snugly against an inner surface 74 of duct 36 at its manifold connection end (FIGS. 1, 2, 3, and 6). Accordingly, upper and lower regions of device web 30 flair out forwardly and sidewardly, as can best be seen in FIGS. 2, 4, and 5.

In order for insert device 10 to be retained securely in duct 36 without the need for being held in place by screws or bolts or other fasteners—which might come loose and be "ingested" into manifold 18—the device is formed having respective upper and lower, outwardly-projecting flanges 76 and 78 (FIGS. 1, 2, 3, and 6). Flanges 76 and 78 are sized and shaped to fit outwardly (that is, radially) into an end one of duct corrugations 80 (FIG. 6). By means of flanges 76 and 78 fitting into end corrugation 80, device 10 is securely held inside of duct 36 when the connection end of the duct is detachably secured, for example, by a large hose clamp 82 (FIG. 6), onto manifold inlet end flange 38.

EXAMPLE

Merely by way of example and with no limitation being hereby intended or implied, for the particular automotive installation mentioned at the beginning of the Description, device 10 may have the following dimensions. The maximum height, $H_1$, of device 10 between surfaces 70 to 72 FIGS. 2 and 3) is about $2\frac{7}{8}$ inches, which is the approximate internal height of duct 36 at its manifold connection end region; the overall height, $H_2$, of device 10 between tips of flanges 76 and 78 is about $3\frac{1}{2}$ inches. The central width, $W_1$, of web 30 is about $\frac{1}{2}$ inch, and the overall or maximum width, $W_2$, of device 10 is about 3 inches (FIG. 2). The radius, R, of web side surfaces 32 and 34 is about 1 inch (FIG. 2). The length, $L_1$, of device 10 from the forward tips of web 30 to a forward face 90 of flange 76 is about 1 inch; the overall length, $L_2$, of the device is about $2\frac{1}{4}$ inches (FIG. 3). The depth, D, of web 30 in central regions is about $\frac{7}{8}$ inch. The diameter, d, of idling air flow apertures 58 and 60 through device web 30 is about 5/16 inch, the two apertures being spaced about $\frac{1}{2}$ inch apart, center-to-center (FIG. 2). Device 10 may advantageously be constructed of cast aluminum for strength, durability and light weight. Alternatively, device 10 may be constructed of a rigid, tough, heat-resistant plastic, such as PVC. As above mentioned, however, the exact size and shape of device 10 is dictated by the size and shape of air intake duct 36 and air intake manifold 18, including the size, shape, number and spacing of the air intake passages in the manifold.

Although there is described above a specific arrangement of an intake air flow divider insert device for use with air intake manifolds of internal combustion engines in accordance with the present invention for the purpose of illustrating the manner in which the invention may be used to advantage, it will be appreciated that the invention is not limited thereto. Accordingly, any and all variations and modifications which may occur to those skilled in the art are to be considered to be within the scope and spirit of the invention as defined in the appended claims.

What is claimed is:

1. An intake air flow divider insert device for installation in an air intake duct connected to the intake end of an air intake manifold for an internal combustion engine, said manifold having a number, N, of main air flow passages originating at the air intake end thereof, the number, N, being equal to at least two, said device comprising an insert body having:

(a) wall means configured for smoothly dividing a single flow of air impinging on upstream regions of the device into a number, N, of air flows, wherein said number of air flows is equal to the number, N, of manifold air flow passages, and configured for diverting each of said N air flows smoothly into a corresponding one of said manifold N main air flow passages when the insert device is installed in the air intake duct just upstream of said manifold, and (b) peripheral edge regions for enabling said insert device to be fixed inside said air intake duct adjacent the air intake manifold when said intake duct is detachably connected to the inlet end of said manifold in a normal manner.

2. The intake air flow divider insert device as claimed in claim 1, wherein the number, N, of manifold main airflow passages is equal to two, and wherein said insert wall means define a central web which has a varying downstream width that substantially conforms to the spacing between the main air intake passages in the air intake manifold at the intake end thereof.

3. The intake air flow divider insert device as claimed in claim 2, wherein said central web is generally triangular in transverse cross section, having a relatively sharp upstream edge region.

4. The intake air flow divider insert device claimed in claim 2, wherein said inlet end of said manifold is formed having one or more small idling air flow passages between said main air intake passages, and wherein said insert device web is formed having a like number of idler air flow apertures formed therethrough so as to be in axial alignment with said idling air flow passages in said intake manifold when the insert device is installed and properly oriented in said air intake duct to thereby provide separate flows of idling air to the idling air flow passages in the manifold.

5. The intake air flow divider insert device as claimed in claim 1, wherein upstream regions of said insert are sized and shaped to fit closely into a region of said air intake duct upstream of where the duct detachably connects to the inlet end of the air intake manifold so that intake air flowing through said duct is required to flow around side regions of the insert device and to be thereby divided into said N smaller air flows.

6. The intake air flow divider insert device as claimed in claim 1, wherein said air intake duct is a type which is formed having accordion-pleat corrugations in regions of the duct which detachably connect to the inlet end of the air intake manifold and wherein said device body is formed having radial flange regions configured to fit into one of said corrugations in said air intake duct.

7. The intake air flow divider insert device as claimed in claim 1 wherein the inlet end of the air intake manifold is formed having a forwardly extending air duct attachment flange defining a recess into the inlet end of the manifold, and wherein downstream regions of said insert device are sized and shaped to fit into said recess.

8. An intake air flow divider insert device for insertion in an air intake duct connected to the intake end of an air intake manifold for an internal combustion engine, said manifold having a number, N, of main intake air flow passages originating at the air intake end thereof, the number, N, being equal to at least two, and the inlet end of said manifold is formed having one or more small idling air flow passages, said device comprising an insert body having:

wall means configured for smoothly dividing a single flow of intake air impinging on upstream regions of the device into a number, N, of air flows, wherein said number of air flows is equal to the number, N, of manifold intake air flow passages, and configured for diverting each of said N air flows smoothly into a corresponding one of said manifold N intake air flow passages when the insert device is installed in the air intake duct just upstream of said manifold, and (b) peripheral edge regions for enabling said insert device to be fixed inside said air intake duct adjacent the air intake manifold when said intake duct is detachably connected to the inlet end of said manifold in a normal manner, upstream regions of said insert device body being sized and shaped to fit closely into a region of said air intake duct upstream of where the duct detachably connects to the inlet end of the air intake manifold so that intake air flowing through said duct is required to flow around side regions of the insert device and to be thereby divided into said N smaller air flows, said insert device web being formed having a like number of idling air flow apertures therethrough so as to be in axial alignment with said idling air flow passages in said intake manifold when the insert device is installed and properly oriented in said air intake duct to thereby provide separate flows of idling air to the idling air flow passages in the manifold.

9. The intake air flow divider insert device as claimed in claim 8, wherein said air intake duct is a type which is formed having accordion-pleat corrugations in regions of the duct which detachably connect to the inlet end of the air intake manifold and wherein said device body is formed having radial flange regions configured to fit into said corrugations in said air intake duct.

10. The intake air flow divider insert device as claimed in claim 8, wherein the number, N, of manifold intake air passages is equal to two, and wherein said insert wall means define a central web which has a varying downstream width that substantially conforms to the spacing between said intake air passages in the air intake manifold at the intake end thereof, said central web being generally triangular in transverse cross section and having a relatively sharp upstream edge region.

11. The intake air flow divider insert device as claimed in claim 8, wherein the inlet end of the air intake manifold is formed having a forwardly extending air duct attachment flange defining a recess into the inlet end of the manifold, and wherein downstream regions of said insert device are sized and shaped to fit into said recess.

12. An intake air flow divider insert device for installing into an air intake duct configured for being detachably connected to the air intake end of an air intake manifold for an internal combustion engine, said manifold having first and second intake air flow passages originating at the air intake end thereof, and the inlet end of said manifold is formed having one or more small idling air flow passages intermediate said first and second intake air flow passages, said device comprising an insert body having:

(a) wall means configured for smoothly dividing a single flow of intake air impinging on upstream regions of the device into first and second smaller air flows, and configured for diverting each of said first and second smaller air flows smoothly into a corresponding one of said manifold first and second intake air flow passages when the insert device is installed and properly oriented in the air intake duct and said duct is connected to an inlet end region of said manifold, and (b) peripheral edge regions for enabling said insert device to be fixed inside said air intake duct adjacent the air intake manifold when said intake duct is detachably connected to the inlet end of said manifold in a normal manner, upstream regions of said insert device body being sized and shaped to fit closely into a region of said air intake duct upstream of where the duct detachably connects to the inlet end of the air intake manifold so that intake air flowing through said duct is required to flow around side regions of the insert device and to be thereby divided into said two smaller air flows, said insert device body being formed having one or more idling idler air flow apertures therethrough so as to be in axial alignment with corresponding ones of said idling air flow channels in said intake manifold when the insert device is installed and properly oriented in said air intake duct to thereby provide separate flows of idler air to the idling air flow passages in the manifold.

13. The intake air flow divider insert device claimed in claim 12, wherein said air intake duct is a type which is formed having accordion-pleat corrugations in regions of the duct which detachably connect to the inlet end of the air intake manifold and wherein said device body is formed having radial flange regions configured to fit into said corrugations in said air intake duct.

14. The intake air flow divider insert device as claimed in claim 12, wherein the inlet end of the air intake manifold is formed having a forwardly extending air duct attachment flange defining a recess into the inlet end of the manifold, and wherein downstream regions of said insert device are sized and shaped to fit into said recess.

15. A intake air flow divider insert device for installation in an air intake duct connected to the intake end of an air intake manifold for an internal combustion engine, said manifold having two main air flow passages originating at the air intake end thereof, said device comprising an insert body having:

(a) wall means for smoothly dividing a single flow of intake air impinging on upstream regions of the device into two air flows, said wall means comprising means defining first and second arcuate side edges, each side edge being concave with respect to the wall means; and (b) peripheral edge regions for enabling said insert device to be inserted inside said air intake duct adjacent the air intake manifold when said intake duct is detachably connected to the inlet end of said manifold in a normal manner.

16. The intake air flow divider insert device as claimed in claim 1 wherein said arcuate side edges are semi-circular in shape.

17. The intake air flow divider insert device as claimed in claim 16, wherein said central web is generally triangular in transverse cross-section, having a relatively sharp upstream edge region.

18. The intake air flow divider insert device as claimed in claim 16, wherein said inlet end of said manifold is formed having one or more small idling air flow passages between said main air intake passages, and wherein said insert device web is formed having a like number of idler air flow apertures formed therethrough so as to be in axial alignment with said idling air flow passages in said intake manifold when the insert device is installed and properly oriented in said air intake duct to there-by provide separate flow of idling air to the idling air flow passages in the manifold.

19. The intake air flow divider insert device as claimed in claim 1, wherein upstream regions of said insert are sized and shaped to fit closely into a region of said air intake duct upstream of where the duct detachably connects to the inlet end of the air intake manifold so that intake air flowing through said duct is required to flow around side regions of the insert device and to be thereby divided into said two air flows.

* * * * *

UNITED STATES PATENT AND TRADEMARK OFFICE
CERTIFICATE OF CORRECTION

PATENT NO. : 5,083,531
DATED : January 28, 1992
INVENTOR(S) : Steve Gregory and Dan S. Wible It is certified that error appears in the above-identified patent and that said Letters Patent is hereby corrected as shown below:

Claim 16, Column 10, line 13 delete "claim 1" and insert therefor -- claim 15 --.

Claim 19, column 10, line 31 delete "claim 1" and insert therefor -- claim 16 --.

Signed and Sealed this

Seventh Day of September, 1993

Attest:

BRUCE LEHMAN

Attesting Officer — Commissioner of Patents and Trademarks